(12) United States Patent
Hanczor et al.

(10) Patent No.: US 11,808,864 B2
(45) Date of Patent: Nov. 7, 2023

(54) MULTI-SENSOR VEHICLE POSITIONING SYSTEM EMPLOYING SHARED DATA PROTOCOL

(71) Applicant: Piper Networks, Inc., San Diego, CA (US)

(72) Inventors: Robert Hanczor, San Diego, CA (US); David Garcia, San Diego, CA (US); Duane Maxwell, San Diego, CA (US)

(73) Assignee: Piper Networks, Inc., San Diego, CA (US)

( * ) Notice: Subject to any disclaimer, the term of this patent is extended or adjusted under 35 U.S.C. 154(b) by 114 days.

(21) Appl. No.: 17/353,346

(22) Filed: Jun. 21, 2021

(65) Prior Publication Data

US 2021/0405215 A1    Dec. 30, 2021

Related U.S. Application Data

(60) Provisional application No. 63/045,029, filed on Jun. 26, 2020.

(51) Int. Cl.
| | |
|---|---|
| *G01S 19/46* | (2010.01) |
| *H04B 17/309* | (2015.01) |
| *G01S 19/52* | (2010.01) |
| *G01S 19/47* | (2010.01) |

(52) U.S. Cl.
CPC .............. *G01S 19/46* (2013.01); *G01S 19/47* (2013.01); *G01S 19/52* (2013.01); *H04B 17/309* (2015.01)

(58) Field of Classification Search
CPC .................................................. H04B 17/309
See application file for complete search history.

(56) References Cited

U.S. PATENT DOCUMENTS

| | | | |
|---|---|---|---|
| 4,711,418 A | 12/1987 | Aver, Jr. et al. | |
| 5,420,883 A | 5/1995 | Swensen et al. | |
| 6,900,740 B2 | 5/2005 | Bloomquist et al. | |
| 9,470,531 B2 | 10/2016 | Moerman | |
| 2005/0174974 A1 | 8/2005 | Sonnitag et al. | |
| 2008/0180316 A1 | 7/2008 | Pande et al. | |
| 2011/0208424 A1 | 8/2011 | Hirsch et al. | |

(Continued)

FOREIGN PATENT DOCUMENTS

WO    WO-2018108180 A1 *   6/2018    ........... A01D 34/008

OTHER PUBLICATIONS

International Search Report and Written Opinion in PCT/US2020/048839, dated Nov. 30, 2020.

(Continued)

*Primary Examiner* — Timothy A Brainard
*Assistant Examiner* — Hailey R Le

(57) ABSTRACT

In general, one aspect disclosed features a computer-implemented method comprising: determining whether Global Positioning System (GPS) location data are available; responsive to determining the GPS location data are available, causing transmission of a first message in National Marine Electronics Association (NMEA) format, the first message comprising the GPS location data; and responsive to determining the GPS location data are not available: determining a location based on non-GPS location data, generating a second message in NMEA format, the second message representing the determined location, and transmitting the second message.

8 Claims, 3 Drawing Sheets

(56) References Cited

U.S. PATENT DOCUMENTS

| | | | |
|---|---|---|---|
| 2012/0105279 | A1 | 5/2012 | Brown et al. |
| 2012/0283947 | A1* | 11/2012 | T'Siobbel .............. G01S 19/22 |
| | | | 701/469 |
| 2013/0127643 | A1 | 5/2013 | Malarky |
| 2014/0210595 | A1 | 7/2014 | Kanner et al. |
| 2015/0329130 | A1 | 11/2015 | Carlson et al. |
| 2016/0109582 | A1 | 4/2016 | Sendonaris et al. |
| 2016/0121912 | A1 | 5/2016 | Puttagunta et al. |
| 2016/0280240 | A1 | 9/2016 | Carlson et al. |
| 2018/0114441 | A1 | 4/2018 | Marmet |
| 2018/0188380 | A1* | 7/2018 | Venkatraman ....... G01C 21/165 |
| 2019/0090117 | A1* | 3/2019 | Shirahatti .............. H04W 4/02 |
| 2019/0113631 | A1* | 4/2019 | Stroiescu ............... G01S 19/49 |
| 2020/0309533 | A1* | 10/2020 | Young .................. G06V 10/811 |

OTHER PUBLICATIONS

International Search Report and Written Opinion in PCT/US20/049767, dated Dec. 9, 2020.
Electromagnetic compatability and Radio spectrum Matters (ERM); Short Range Devices (SRD); UWB location tracking devices in railroad environment. ETSI Technical Report, ETSI TR 101 538 V1.1.1 (Oct. 2020).
International Search Report and Written Opinion in PCT/US2021/038268, dated Oct. 14, 2021.
International Preliminary Report on Patentability for Application No. PCT/US2021/038268, dated Jan. 5, 2023, 10 pages.

* cited by examiner

MULTI-SENSOR VEHICLE POSITIONING SYSTEM EMPLOYING SHARED DATA PROTOCOL

CROSS REFERENCE TO RELATED APPLICATIONS

The present application claims priority to U.S. Provisional Patent Application No. 63/045,029, filed Jun. 26, 2020, entitled "MULTI-SENSOR RAIL POSITIONING SYSTEM EMPLOYING SHARED DATA PROTOCOL," the disclosure thereof incorporated by reference herein in its entirety.

The present application is related to U.S. patent application Ser. No. 17/008,450 filed Aug. 31, 2020, U.S. patent application Ser. No. 17/014,974 filed Sep. 8, 2020, and U.S. patent application Ser. No. 17/076,668 filed Oct. 21, 2020, the disclosures thereof incorporated by reference herein in their entirety.

DESCRIPTION OF RELATED ART

The disclosed technology relates generally to location determination, and more particularly some embodiments relate to location determination for vehicles.

SUMMARY

In general, one aspect disclosed features a system, comprising: a hardware processor; and a non-transitory machine-readable storage medium encoded with instructions executable by the hardware processor to perform operations comprising: determining whether Global Positioning System (GPS) location data are available; responsive to determining the GPS location data are available, causing transmission of a first message in National Marine Electronics Association (NMEA) format, the first message comprising the GPS location data; and responsive to determining the GPS location data are not available: determining a location based on non-GPS location data, generating a second message in NMEA format, the second message representing the determined location, and causing transmission of the second message.

Embodiments of the system may include one or more of the following features. In some embodiments, determining the location based on the non-GPS location data comprises: determining the location based on the GPS location data and the non-GPS location data. In some embodiments, determining the location based on the GPS location data and the non-GPS location data comprises: determining a first quality of service (QoS) of the GPS location data; determining a second QoS of the non-GPS location data; and determining the location based on the GPS location data, the non-GPS location data, the first QoS, and the second QoS. In some embodiments, determining the location based on the GPS location data, the non-GPS location data, the first QoS, and the second QoS comprises: weighting the GPS location data according to the first QoS; weighting the non-GPS location data according to the second QoS; and determining the location based on the weighted GPS location data and the weighted non-GPS location data. In some embodiments, determining whether the GPS location data are available comprises: determining a quality of service (QoS) of the GPS location data; determining, based on the QoS of the GPS location data, whether a quality of the GPS location data is above a quality threshold; and responsive to determining the quality of the GPS location data is not above the quality threshold, determining the GPS location data are unavailable. In some embodiments, the non-GPS location data comprise at least one of: ultra-wideband (UWB) radio ranging data; light-detection and ranging (lidar) data; radio detection and ranging (radar) data; sound navigation and ranging (sonar) data; and inertial measurement unit (IMU) data. In some embodiments, the operations further comprise: determining a velocity based on the GPS location data and/or the non-GPS location data.

In general, one aspect disclosed features non-transitory machine-readable storage medium encoded with instructions executable by a hardware processor of a computing component, the machine-readable storage medium comprising instructions to cause the hardware processor to perform operations comprising: determining whether Global Positioning System (GPS) location data are available; responsive to determining the GPS location data are available, causing transmission of a first message in National Marine Electronics Association (NMEA) format, the first message comprising the GPS location data; and responsive to determining the GPS location data are not available: determining a location based on non-GPS location data, generating a second message in NMEA format, the second message representing the determined location, and causing transmission of the second message.

Embodiments of the non-transitory machine-readable storage medium may include one or more of the following features. In some embodiments, determining the location based on the non-GPS location data comprises: determining the location based on the GPS location data and the non-GPS location data. In some embodiments, determining the location based on the GPS location data and the non-GPS location data comprises: determining a first quality of service (QoS) of the GPS location data; determining a second QoS of the non-GPS location data; and determining the location based on the GPS location data, the non-GPS location data, the first QoS, and the second QoS. In some embodiments, determining the location based on the GPS location data, the non-GPS location data, the first QoS, and the second QoS comprises: weighting the GPS location data according to the first QoS; weighting the non-GPS location data according to the second QoS; and determining the location based on the weighted GPS location data and the weighted non-GPS location data. In some embodiments, determining whether the GPS location data are available comprises: determining a quality of service (QoS) of the GPS location data; determining, based on the QoS of the GPS location data, whether a quality of the GPS location data is above a quality threshold; and responsive to determining the quality of the GPS location data is not above the quality threshold, determining the GPS location data are unavailable. In some embodiments, the non-GPS location data comprise at least one of: ultra-wideband (UWB) radio ranging data; light-detection and ranging (lidar) data; radio detection and ranging (radar) data; sound navigation and ranging (sonar) data; and inertial measurement unit (IMU) data. In some embodiments, the operations further comprise: determining a velocity based on the GPS location data and/or the non-GPS location data.

In general, one aspect disclosed features a computer-implemented method comprising: determining whether Global Positioning System (GPS) location data are available; responsive to determining the GPS location data are available, causing transmission of a first message in National Marine Electronics Association (NMEA) format, the first message comprising the GPS location data; and responsive to determining the GPS location data are not available: determining a location based on non-GPS location data, generating a second message in NMEA format, the second message representing the determined location, and transmitting the second message.

Embodiments of the method may include one or more of the following features. In some embodiments, wherein determining the location based on the non-GPS location data comprises: determining the location based on the GPS location data and the non-GPS location data. In some embodiments, determining the location based on the GPS location data and the non-GPS location data comprises: determining a first quality of service (QoS) of the GPS location data; determining a second QoS of the non-GPS location data; and determining the location based on the GPS location data, the non-GPS location data, the first QoS, and the second QoS. In some embodiments, determining the location based on the GPS location data, the non-GPS location data, the first QoS, and the second QoS comprises: weighting the GPS location data according to the first QoS; weighting the non-GPS location data according to the second QoS; and determining the location based on the weighted GPS location data and the weighted non-GPS location data. In some embodiments, determining whether the GPS location data are available comprises: determining a quality of service (QoS) of the GPS location data; determining, based on the QoS of the GPS location data, whether a quality of the GPS location data is above a quality threshold; and responsive to determining the quality of the GPS location data is not above the quality threshold, determining the GPS location data are unavailable. In some embodiments, the non-GPS location data comprise at least one of: ultra-wideband (UWB) radio ranging data; light-detection and ranging (lidar) data; radio detection and ranging (radar) data; sound navigation and ranging (sonar) data; and inertial measurement unit (IMU) data.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

The U.S. Congress has mandated the development of a Positive Train Control (PTC) system for maintaining accurate train location information. The PTC system relies primarily on the Global Positioning System (GPS) for obtaining the location information. However, in some train environments GPS is unreliable, for example underground, in dense urban areas, and the like. When GPS is unavailable, a 20 mph maximum speed limit has been imposed to mitigate the resulting location uncertainty.

Embodiments of the present disclosure provide multi-sensor vehicle positioning systems to provide train location information even when GPS is unavailable. In the described embodiments, the vehicles are described as trains traveling along train tracks. However, it should be understood that the disclosed technologies apply to other vehicles and transportation pathways as well. The vehicles may include a light rail train, a commuter train, a freight train, an automobile, an airplane, a ship, a space vehicle, a ski lift, a gondola, or similar forms of transportation. The transportation pathway may be any pathway along which the respective vehicle moves, such as a train track, a road, a canal or shipping lane, a runway, an airway, or similar transportation pathways.

The disclosed technologies provide one or more additional positioning systems that may replace GPS when it is unavailable, and that may augment GPS when it is available. Current onboard train control computer are designed to accept GPS messages in the National Marine Electronics Association (NMEA) format, a standard format supported by all GPS device manufacturers. The disclosed technologies may provide positioning information in NMEA format. Therefore no change to existing train control systems is required.

Figure 1:
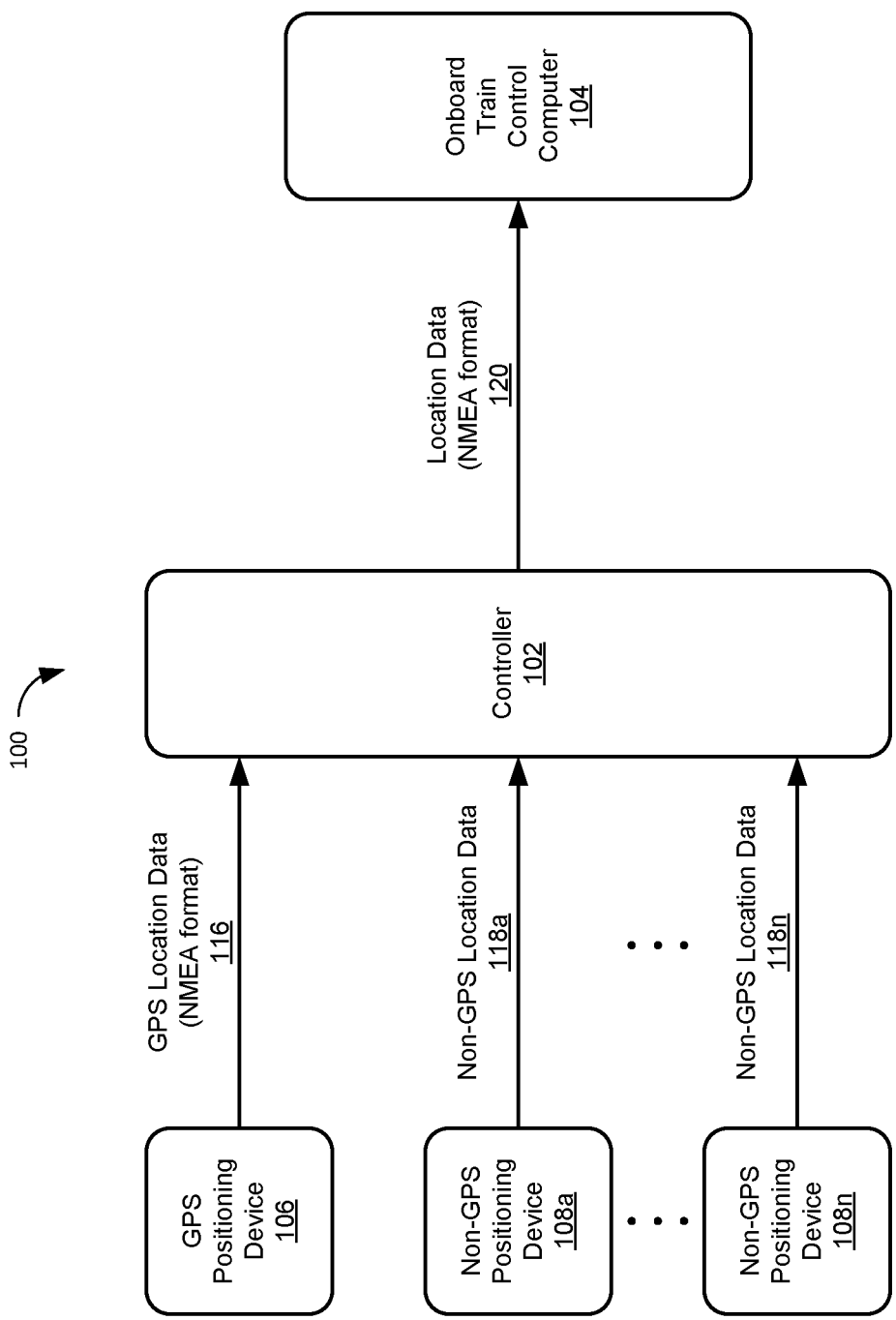
FIG. 1 illustrates a train control system according to some embodiments of the disclosed technologies.

FIG. 1 illustrates a train control system 100 according to some embodiments of the disclosed technologies. The train control system 100 may include a controller 102. The controller 102 may be implemented as described in detail below with reference to FIG. 3.

The train control system 100 may include a GPS positioning device 106. The GPS positioning device 106 may be implemented in a conventional manner. The GPS positioning device 106 may transmit GPS location data 116 to the controller 102. The GPS positioning device 106 may provide the GPS location data 116 in the form of messages in the NMEA format.

The train control system 100 may include one or more non-GPS positioning devices 108a-n. The non-GPS positioning devices 108 may include any positioning devices other than GPS positioning devices. For example, the non-GPS positioning devices 108 may include ultra-wideband (UWB) radio ranging devices, light-detection and ranging (lidar) devices, radio detection and ranging (radar) devices, sound navigation and ranging (sonar) devices, inertial measurement unit (IMU) devices, and similar devices. The non-GPS positioning devices 108a-n may provide non-GPS location data 118a-n. For example, the non-GPS location data may include UWB radio ranging data, lidar data, radar data, sonar data, IMU data, and similar ranging data.

The train control system 100 may include an onboard train control computer 104. The onboard train control computer 104 may be implemented in a conventional manner, and may accept position data in the form of messages in the NMEA format.

The controller 102 may generate location data 120 based on the GPS location data 116, any of the non-GPS location data 118a-n, or any combination thereof. The controller 102 may provide the location data 120 to the onboard train control computer 104. The location data 120 may take the form of messages in the NMEA format.

Figure 2:
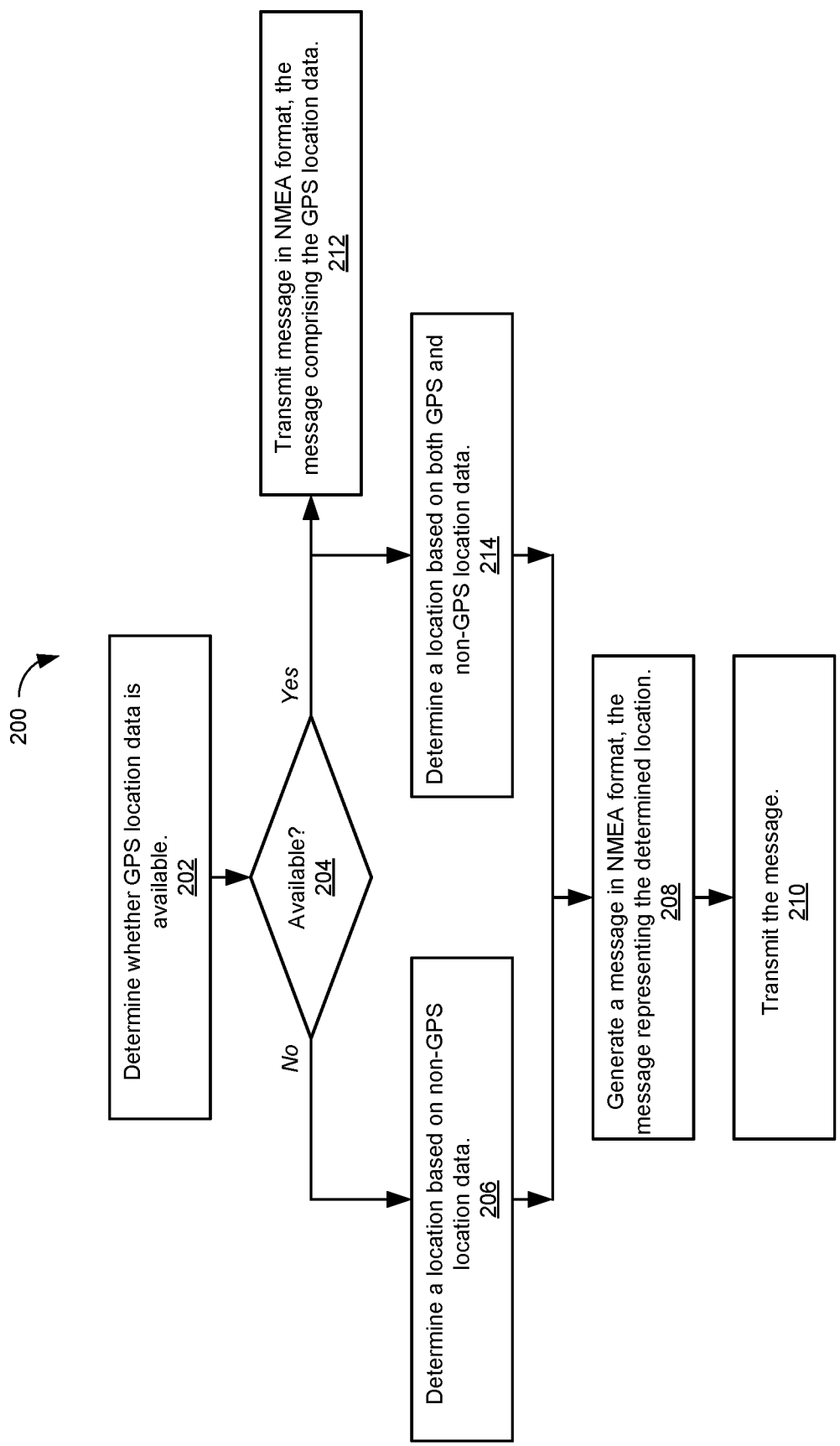
FIG. 2 is a flowchart illustrating a process for multi-sensor vehicle positioning systems according to some embodiments of the disclosed technologies.

FIG. 2 is a flowchart illustrating a process 200 for multi-sensor vehicle positioning systems according to some embodiments of the disclosed technologies. The process 200 may be implemented by the controller 102 of the train control system 100 of FIG. 1.

The elements of the process 200 are presented in one arrangement. However, it should be understood that one or more elements of the process may be performed in a different order, in parallel, omitted entirely, and the like. Furthermore, the process 200 may include other elements in addition to those presented. For example, the process 200 may include error-handling functions if exceptions occur, and the like.

Referring to FIG. 2, the process 200 may include determining whether Global Positioning System (GPS) location data are available, at 202. In the example of FIG. 1, the controller 102 may determine whether the received GPS location data are available. In some cases, the controller 102 may determine that the received GPS location data are unavailable when no GPS location data 116 are received. In some cases, the controller 102 may determine the quality of the received GPS location data, and may determine that the received GPS location data are unavailable by determining the quality of the received GPS location data to be insufficient. For example, the controller 102 may determine a quality of service (QoS) of the received GPS location data, and may determine the quality of the received GPS location data based on the QoS of the received GPS location data. The QoS of the received GPS location data may be determined in a conventional manner. The controller 102 may compare the determined quality to a quality threshold. The controller 102 may determine the received GPS location data are unavailable when the quality of the received GPS location data is not above the quality threshold.

Referring again to FIG. 2, the process 200 may include, responsive to determining the GPS location data are not available, at 204, determining a location based on non-GPS location data, at 206. Speed or velocity may be determined based on the non-GPS location data as well. In the example of FIG. 1, the controller 102 may determine the location based on non-GPS location data 118 provided by one or more of the non-GPS positioning devices 108.

In some embodiments, the non-GPS location data 118 may include ultra-wideband radio (UWB) ranging data. Collecting UWB ranging data, and determining a location based on the UWB ranging data, may be performed as described in U.S. patent application Ser. No. 17/008,450 filed Aug. 31, 2020 and U.S. patent application Ser. No. 17/014,974 filed Sep. 8, 2020, the disclosures thereof incorporated by reference herein in their entirety.

In some embodiments, the non-GPS location data 118 may include light-detection and ranging (lidar) data. Collecting lidar data, and determining a location based on the lidar data, may be performed as described in U.S. patent application Ser. No. 17/076,668 filed Oct. 21, 2020, the disclosure thereof incorporated by reference herein in its entirety.

Referring again to FIG. 2, the process 200 may include generating a message in NMEA format, the message representing the determined location, at 208. The message may represent speed or velocity as well. The process 200 may include transmitting the second message, at 210. In the example of FIG. 1, the controller 102 may transmit the location data 120 to the onboard train control computer 104.

Referring again to FIG. 2, the process 200 may include, responsive to determining the GPS location data are available, at 204, transmitting a message in National Marine Electronics Association (NMEA) format, the message comprising the GPS location data, at 212. In the example of FIG. 1, the controller may transmit location data 122 to the onboard train control computer 104 in the NMEA format. In cases where no non-GPS location data 118 is used, the controller 102 may simply forward messages received from the GPS positioning device 106 to the onboard train control computer 104.

Alternatively, referring again to FIG. 2, the process 200 may include, responsive to determining the GPS location data are available, at 204, determining a location based on both GPS and non-GPS location data, at 214. In the example of FIG. 1, the controller 102 may determine the location based on the GPS location data 116 and the non-GPS location data 118 provided by one or more of the non-GPS positioning devices 108. The process 200 may include generating a message in NMEA format, the message representing the determined location, and transmitting the message, for example as described above.

Determining a location based on location data provided by multiple positioning devices 106, 108 may be accomplished in any manner. In some embodiments, a location may be determined based on each set of location data, and the resulting locations may be combined. In some embodiments, corresponding components of the location data may be combined, and a location may be determined based on the combined components. For example, latitude and longitude parameters may be combined separately, and the location may be determined based on the combined latitude and longitude parameters.

Any technique may be used for combining the locations or parameters. The locations or parameters indicated by the devices may simply be averaged. In some embodiments, the locations or parameters may be combined according to the quality of the corresponding location data. For example, a QoS may be determined for each set of location data, and the corresponding location or parameters may be weighted according to that QoS. The weighted locations or parameters then may be combined in any manner.

Figure 3:
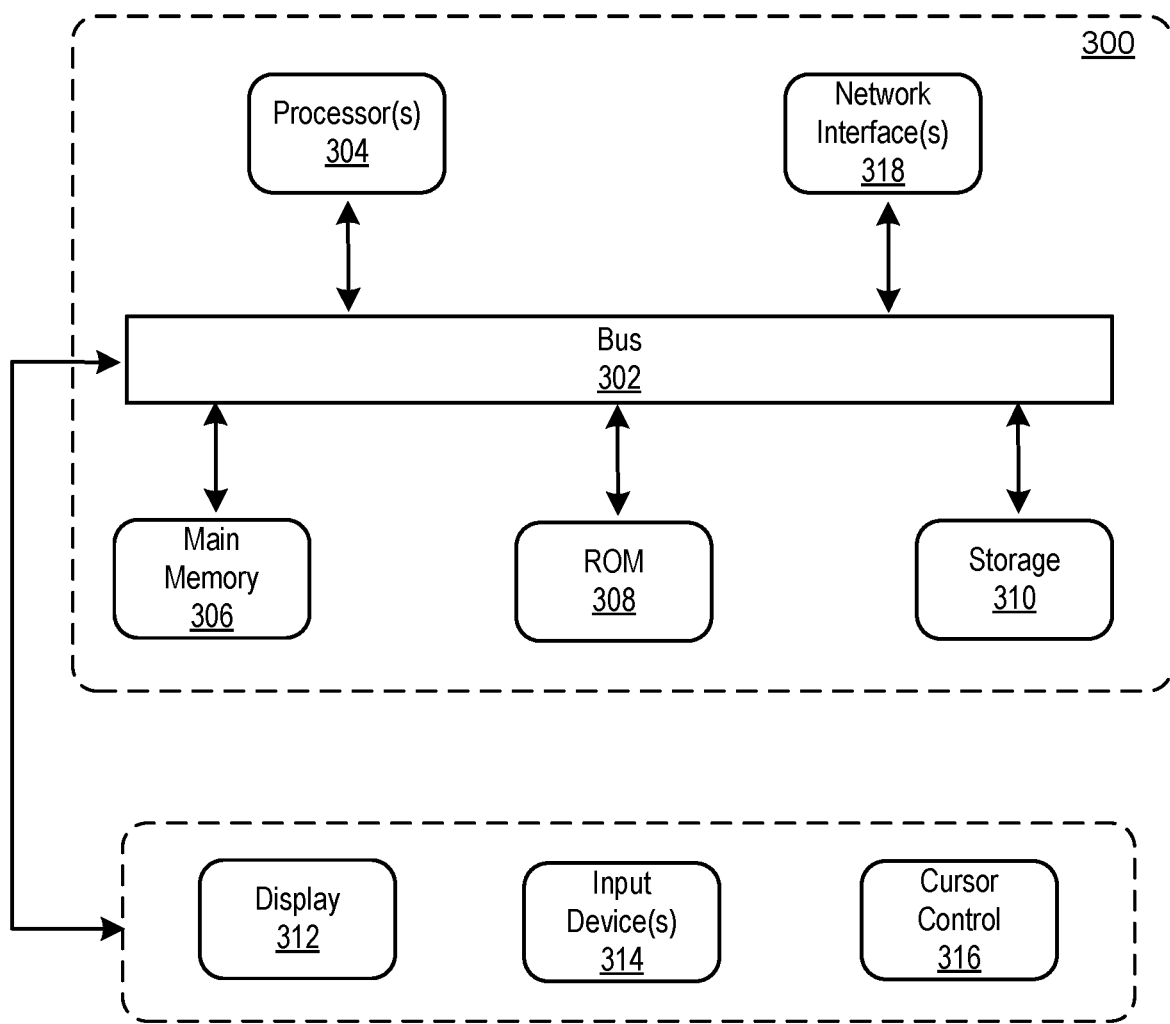
FIG. 3 is an example computing component that may be used to implement various features of embodiments described in the present disclosure.

FIG. 3 depicts a block diagram of an example computer system 300 in which embodiments described herein may be implemented. The computer system 300 includes a bus 302 or other communication mechanism for communicating information, one or more hardware processors 304 coupled with bus 302 for processing information. Hardware processor(s) 304 may be, for example, one or more general purpose microprocessors.

The computer system 300 also includes a main memory 306, such as a random access memory (RAM), cache and/or other dynamic storage devices, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

The computer system 300 further includes a read only memory (ROM) 308 or other static storage device coupled to bus 302 for storing static information and instructions for processor 304. A storage device 310, such as a magnetic disk, optical disk, or USB thumb drive (Flash drive), etc., is provided and coupled to bus 302 for storing information and instructions.

The computer system 300 may be coupled via bus 302 to a display 312, such as a liquid crystal display (LCD) (or touch screen), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. In some embodiments, the same direction information and command selections as cursor control may be implemented via receiving touches on a touch screen without a cursor.

The computing system 300 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor(s) 304 executing one or more sequences of one or more instructions contained in main memory 306. Such instructions may be read into main memory 306 from another storage medium, such as storage device 310. Execution of the sequences of instructions contained in main memory 306 causes processor(s) 304 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 310. Volatile media includes dynamic memory, such as main memory 306. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 302. Transmission media can also take the form of acoustic or light waves, such as those generated during radio-wave and infra-red data communications.

The computer system 300 also includes a communication interface 318 coupled to bus 302. Network interface 318 provides a two-way data communication coupling to one or more network links that are connected to one or more local networks. For example, communication interface 318 may be an integrated services digital network (ISDN) card, cable modem, satellite modem, or a modem to provide a data communication connection to a corresponding type of telephone line. As another example, network interface 318 may be a local area network (LAN) card to provide a data communication connection to a compatible LAN (or a WAN component to communicate with a WAN). Wireless links may also be implemented. In any such implementation, network interface 318 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 318, which carry the digital data to and from computer system 300, are example forms of transmission media.

The computer system 300 can send messages and receive data, including program code, through the network(s), network link and communication interface 318. In the Internet example, a server might transmit a requested code for an application program through the Internet, the ISP, the local network and the communication interface 318.

The received code may be executed by processor 304 as it is received, and/or stored in storage device 310, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 300.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
   a hardware processor; and
   a non-transitory machine-readable storage medium encoded with instructions executable by the hardware processor to perform operations comprising:
   receiving Global Positioning System (GPS) location data;
   determining a first quality of service (QOS) of the GPS location data;
   determining, based on the first QoS of the GPS location data, whether a quality of the GPS location data is above a quality threshold;
   responsive to determining the quality of the GPS location data is above the quality threshold, determining the GPS location data are available;
   responsive to determining the quality of the GPS location data is not above the quality threshold, determining the GPS location data are unavailable;
   responsive to determining the GPS location data are available:
     determining a first location based on the GPS location data,
     generating a first message in National Marine Electronics Association (NMEA) format, the first message indicating the first location, and
     causing transmission of the first message; and
   responsive to determining the GPS location data are unavailable:
     weighting the GPS location data according to the first QoS,
     determining a second QoS of the non-GPS location data,
     weighting the non-GPS location data according to the second QoS,
     determining a second location based on the weighted GPS location data and the weighted non-GPS location data,
     generating a second message in the NMEA format, the second message indicating the second location, and
     causing transmission of the second message.

2. The system of claim 1, wherein the non-GPS location data comprise at least one of: ultra-wideband (UWB) radio ranging data; light-detection and ranging (lidar) data; radio detection and ranging (radar) data; sound navigation and ranging (sonar) data; and inertial measurement unit (IMU) data.

3. The system of claim 1, the operations further comprising: determining a velocity based on the GPS location data and/or the non-GPS location data.

4. A non-transitory machine-readable storage medium encoded with instructions executable by a hardware processor of a computing component, the machine-readable storage medium comprising instructions to cause the hardware processor to perform operations comprising:
   receiving Global Positioning System (GPS) location data;
   determining a first quality of service (QOS) of the GPS location data;
   determining, based on the first QoS of the GPS location data, whether a quality of the GPS location data is above a quality threshold;
   responsive to determining the quality of the GPS location data is above the quality threshold, determining the GPS location data are available;
   responsive to determining the quality of the GPS location data is not above the quality threshold, determining the GPS location data are unavailable;
   responsive to determining the GPS location data are available:
     determining a first location based on the GPS location data,
     generating a first message in National Marine Electronics Association (NMEA) format, the first message indicating the first location, and
     causing transmission of the first message; and
   responsive to determining the GPS location data are unavailable:
     weighting the GPS location data according to the first QoS, determining a second QoS of the non-GPS location data, weighting the non-GPS location data according to the second QoS, determining a second location based on the weighted GPS location data and the weighted non-GPS location data, generating a second message in the NMEA format, the second message indicating the second location, and causing transmission of the second message.

5. The non-transitory machine-readable storage medium of claim 4, wherein the non-GPS location data comprise at least one of: ultra-wideband (UWB) radio ranging data; light-detection and ranging (lidar) data; radio detection and ranging (radar) data; sound navigation and ranging (sonar) data; and inertial measurement unit (IMU) data.

6. The non-transitory machine-readable storage medium of claim 4, the operations further comprising: determining a velocity based on the GPS location data and/or the non-GPS location data.

7. A computer-implemented method comprising:

receiving Global Positioning System (GPS) location data;

determining a first quality of service (QOS) of the GPS location data;

determining, based on the first QoS of the GPS location data, whether a quality of the GPS location data is above a quality threshold;

responsive to determining the quality of the GPS location data is above the quality threshold, determining the GPS location data are available;

responsive to determining the quality of the GPS location data is not above the quality threshold, determining the GPS location data are unavailable;

responsive to determining the GPS location data are available:

determining a first location based on the GPS location data, generating a first message in National Marine Electronics Association (NMEA) format, the first message indicating the first location causing transmission of the first message; and responsive to determining the GPS location data are unavailable:

weighting the GPS location data according to the first QoS, determining a second QoS of the non-GPS location data, weighting the non-GPS location data according to the second QoS, determining a second location based on the weighted GPS location data and the weighted non-GPS location data, generating a second message in the NMEA format, the second message indicating the second location, and transmitting the second message.

8. The computer-implemented method of claim 7, wherein the non-GPS location data comprise at least one of: ultra-wideband (UWB) radio ranging data; light-detection and ranging (lidar) data; radio detection and ranging (radar) data; sound navigation and ranging (sonar) data; and inertial measurement unit (IMU) data.

\* \* \* \* \*